United States Patent [19]

Dixon et al.

[11] Patent Number: 4,882,064
[45] Date of Patent: Nov. 21, 1989

[54] METHOD OF REMOVING IMPURITIES FROM HARD WATERS OR WATERS WITH SIGNIFICANT CALCIUM/MAGNESIUM CONCENTRATIONS

[75] Inventors: David R. Dixon; Nevil J. Anderson, both of Victoria, Australia

[73] Assignee: Commonwealth Scientific and Research Organization, Campbell, Australia

[21] Appl. No.: 65,153

[22] Filed: Jun. 19, 1987

Related U.S. Application Data

[63] Continuation of Ser. No. 567,150, Jan. 3, 1984, abandoned, which is a continuation of Ser. No. 363,527, Mar. 30, 1982, abandoned.

[30] Foreign Application Priority Data

Apr. 6, 1981 [AU] Australia .................. PE8330

[51] Int. Cl.$^4$ .................. B01D 15/04; C02F 5/02
[52] U.S. Cl. .................. 210/667; 210/674; 210/687; 210/695; 210/711; 210/713
[58] Field of Search .............. 210/667, 670, 674, 687, 210/695, 711, 660, 663, 665, 673, 709, 712, 713, 743

[56] References Cited

U.S. PATENT DOCUMENTS

| 3,142,638 | 7/1964 | Blaisdell et al. | 210/695 |
| 3,887,498 | 6/1975 | Kuhajer et al. | 210/674 |
| 4,083,782 | 4/1978 | Kunin | 210/687 |
| 4,094,778 | 6/1978 | Denny et al. | 210/687 |
| 4,216,086 | 8/1980 | Lang | 210/667 |
| 4,279,756 | 7/1981 | Weiss et al. | 210/667 |

OTHER PUBLICATIONS

Standard Methods, *Hardness*, Thirteenth Edition, pp. 178–179, American Public Health Association.

Environmental Science and Technology, vol. 7, No. 1, Jan. 1973 (Article by S. R. Jenkins entitled Effect of Selected Cation Concentration on Coagulation and Adhesion to Silica Surfaces of $\partial$—$MnO_2$.

Aquatic Chemistry, An Introduction Emphasizing Chemical Equilibria in Natural Waters, Wiley and Sons, p. 478.

Fine Particles Processing, vol. 1, Proceedings of the International Symposium for Fine Particles Processing, Las Vegas, 1980, published by Amer. Institute of Mining, Metallurgical, and Petroleum Engineers, Inc., 1980.

*Primary Examiner*—Richard V. Fisher
*Assistant Examiner*—Wanda L. Millard
*Attorney, Agent, or Firm*—Cushman, Darby & Cushman

[57] ABSTRACT

A method for removing suspended impurities and colored substances from water which is hard and/or has a pH in excess of 5 which comprises contacting the water at its natural pH with a coagulant/adsorbent which comprises a finely divided particulate mineral material, the individual particles of which have a thin hydroxylated surface layer having a positive zeta potential at the adsorption pH, and separating the thus treated water from the coagulant/adsorbent.

9 Claims, 1 Drawing Sheet

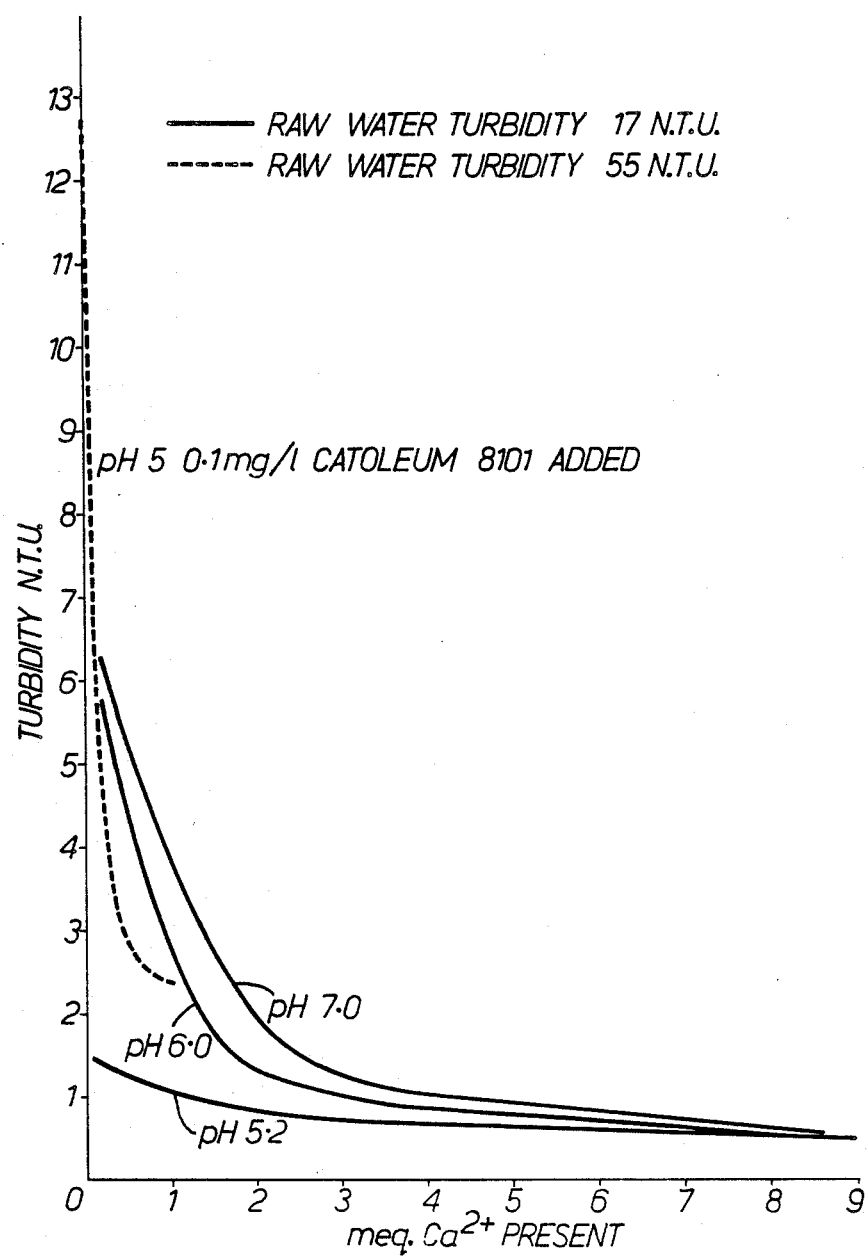

METHOD OF REMOVING IMPURITIES FROM HARD WATERS OR WATERS WITH SIGNIFICANT CALCIUM/MAGNESIUM CONCENTRATIONS

This is a continuation of application Ser. No. 363,527, filed Mar. 30, 1982, now abandoned. This is a continuation of application Ser. No. 567,150, filed Jan. 3, 1984 (now abandoned) which was a continuation of application Ser. No. 363,527, filed Mar. 30, 1982 (now abandoned).

This invention relates to improvements in processes for water clarification.

In particular the invention is concerned with improvements and modifications of the water clarification processes described in our Australian Pat. No. 512,553 and patent application No. 40032/78. In our patent we showed that suspended impurities and coloured substances can be removed from water by contacting the water with a "coagulant/adsorbent" consisting of a finely-divided particulate material, the individual particles of which have been treated to produce a thin hydroxylated surface layer having a positive zeta potential at the adsorption pH. "Adsorption pH" is defined as the pH of the water under treatment and for successful operation of the process must be within the range of pH where suspended solids and natural colouring matters in the water retain some of their negative charge.

The patent application shows that the operation of this process is improved by the addition of a polyelectrolyte during the treatment.

In the patented process, especially when using the preferred coagulant/adsorbent, magnetite, the adsorption pH ranges usually from about 3 to about 5 and is most typically the latter. This places some restrictions on the types of water which can be treated and/or renders it necessary to adjust the pH of the water to be treated.

We have now found, surprisingly, that the presence of hardness, more specifically of calcium and/or magnesium ions, in the raw water to be treated assists in the clarification process and, moreover, extends the range of pH over which clarification can be achieved by our process beyond pH5 to about 8.5. This is of considerable practical importance as it enables many naturally hard waters having a pH of about 6 to about 8 to be treated by our process without the need for pH adjustment. The presence of such hardness in the feed water, however, hinders regeneration of the coagulant/adsorbent and the regeneration techniques described in our prior patent must be modified.

According to one aspect of the present invention, there is provided a method for clarifying water which is hard and/or has a pH in excess of 5 which comprises contacting the water at its natural pH with a coagulant/adsorbent which comprises a finely divided particulate mineral material, the individual particles of which have a thin hydroxylated surface layer having a positive zeta potential at the adsorption pH (as hereinafter defined).

The term "hard water" as used herein has its usual meaning, that is it implies the presence in the water of significant concentrations of calcium and/or magnesium ions.

As indicated above the adsorption pH may range from about 5 up to 8.5, or possibly more. Because the presence of calcium and/or magnesium ions in the water to be treated actually enhances the adsorption process, there is no determinable upper limit to the permissible concentration of these ions in the water to be treated. Furthermore, the higher the concentration of calcium and/or magnesium ions in the water to be treated, the higher is the adsorption pH which can be utilized.

The effect of such concentration on the subsequent regeneration of the coagulant/adsorbent is discussed below.

As already indicated, the preferred coagulant/adsorbent is magnetite, preferably having a particle size of less than 10 microns, more preferably 1 to 5 microns.

The general conditions for preparation of the coagulant/adsorbents, the water treatment and apparatus therefor are described in detail in our Pat. No. 512,553, the disclosure of which is incorporated herein by reference.

Briefly stated, however, the preferred coagulant/adsorbent materials, i.e., those typified by magnetite in which the hydroxylated surface layer is derived directly from the substance of the particles, are formed by suspending the particles in an alkali solution for a short period of time, preferably in the presence of air. The particles are then separated from the solution, e.g., by filtration or decantation, and washed with water by the same technique.

Water treatment is carried out simply by mixing the water to be treated with the coagulant/adsorbent particles, in either a batch or (preferably) continuous process, stirring or agitating the mixture for a period sufficient to allow the suspended (colloidal) impurities and colouring matter in the water to adhere to the particles and separating the particles from the water. A polyelectrolyte may be added during the mixing stage, as described in our patent application No. 40032/78.

As described in the patent regeneration of the loaded coagulant/adsorbent is achieved quite simply by treatment with an alkaline solution at a pH of about 10.5 or more, followed by washing. This is still true for feed waters containing little or no hardness. Our studies on the loading and regeneration of a magnetite coagulant/adsorbent in the presence of calcium and magnesium ions have shown that at pH 4 to 5, i.e., the range normally encountered in the clarification processes of our patent and patent application, magnetite will adsorb some of the $Ca^{2+}$ and/or $Mg^{2+}$ ions from a hard feedwater, increasing its positive surface charge and therefore aiding the removal of the impurities and coloured substances which are generally negatively charged. However, most of the calcium and magnesium ions will remain unadsorbed and will appear in the product water.

At higher pH's such as those encountered in the regeneration stage, adsorption of $Ca^{2+}$ or $Mg^{2+}$ ions is much more complete and can result in sufficient $Ca^{2+}$ and/or $Mg^{2+}$ ions being adsorbed to maintain a positive surface charge on the magnetite even at the regeneration pH, making the release of the negatively charged adsorbed colloids very difficult. In the absence of adsorbed $Ca^{2+}$ or $Mg^{2+}$ ions magnetite assumes a negative surface charge at the regeneration pH, thus aiding the release of the adsorbed colloids.

At intermediate pH levels, e.g., 6 to 8, there may be sufficient adsorption of $Ca^{2+}$ and $Mg^{2+}$ ions (this will depend on both pH and hardness level) to hinder substantially or even to prevent release of colour and turbidity during subsequent regeneration.

The extent to which the above considerations apply depends upon a number of parameters, the most important of which are pH, the level of hardness and the ratio of magnetite surface area to the total amount of $Ca^{2+}$ and $Mg^{2+}$ ions contacted with the magnetite.

Our studies have shown that regeneration of a coagulant/adsorbent loaded by treatment of a hard water must be carried out in a soft environment, i.e., the water used during the regeneration and subsequent washing of the coagulant/adsorbent should be softened, i.e., by removal of at least a part of the calcium and magnesium ions present. Additionally, if adsorption of $Ca^{2+}$ and $Mg^{2+}$ on magnetite has occurred in the clarification stage due to operation at a pH greater than 6 with a hard feedwater, then an acid treatment should be incorporated into the regeneration process. This treatment, which brings about desorption of $Ca^{2+}$ and $Mg^{2+}$ only requires a pH of about 6.0. Softened water must be used in all subsequent steps, including the alkali regeneration treatment.

Obviously, the acid wash can be omitted if the pH of the water to be treated with the regenerated adsorbent is 6 or less.

Thus, in accordance with another aspect, the present invention includes a method for the regeneration of a loaded coagulant/adsorbent (produced in the above-defined method) which comprises:

if necessary, treating the loaded coagulant/adsorbent with an acidic solution having a pH of not more than 6 to desorb calcium and magnesium ions and washing the thus-treated coagulant/adsorbent with softened water;

regenerating the coagulant/adsorbent by treatment with a softened alkaline solution to raise the pH to at least 10.5;

separating the coagulant/adsorbent from the solution and washing the coagulant/adsorbent with softened water.

The degree of softness of the water for the various steps will vary according to the pH and hardness of the feed water in the clarification process. Generally, the efficiency of regeneration and the washing steps decreases as the hardness of the water used therein increases but the latter can be as high as 20 ppm of total Ca/Mg without undue detriment. More specifically, using magnetite as the coagulant/adsorbent, it is preferred that the total Ca/Mg in all of the water contacted with the magnetite during regeneration and washing should preferably not exceed 1 meq. per 10 g of magnetite.

The basis and practice of the invention are further illustrated by the following examples. In the experiments described (except where noted) the magnetite used had a particle size range of 1 to 5 microns and was prepared and activated as described in our Pat. No. 512,553.

The magnetite particles (10 ml) were added to 200 ml of a sodium hydroxide solution of appropriate concentration (e.g., 0.05N) and stirred for 5 to 10 minutes at 25° C. The particles were then filtered and washed with water.

The "standard jar test" referred to in the examples is performed as follows:

A 1 l sample of water is contacted with 10 ml of magnetite for 15 minutes at 160 RPM at the optimum pH (determined in prior experiments). The stirring is stopped and the magnetite allowed to settle for 5 minutes. The unfiltered supernatant liquor is then analysed for residual turbidity and colour.

EXAMPLE 1

Effect of hardness on clarification

Standard jar tests were performed on Yarra River (Vic.) water with varying levels of added $CaCl_2$ and demonstrated that improved removal of turbidity was obtained with increasing hardness. This became quite marked where the clarification was performed at pH 6 and above, as shown in FIG. 1.

Similar results were obtained when a small dose of a polyelectrolyte (0.1 mg/l Catoleum 8101) was added towards the end of the clarification step. Hardness present in the magnesium form was found to give an effect of similar magnitude to calcium as can be seen from the following jar tests carried out on Yarra River water of turbidity 52 NTU at pH 5 without polyelectrolyte.

| Test | Ca(meq)in water | Mg(meq)in water | Turbidity N.T.U. |
|---|---|---|---|
| 1 | — | — | 17 |
| 2 | 1.0 | — | 7.8 |
| 3 | — | 1.0 | 8.2 |

EXAMPLE 2

Effect of Ca and Mg hardness on regeneration

Three identical samples of magnetite were loaded with colloidal impurities in standard jar tests at pH 5 using 1 mg/l of Catoleum 8101 polyelectrolyte. Regeneration was simulated by raising the pH of the entire clarification mixture to pH 11.5 then allowing the magnetite to settle and decanting the supernatant. Washing stages were simulated by washing with 200 ml volumes of wash water at 4 separate pH values. The wash water added to the second and third magnetite samples was dosed respectively with 5 meq/l NaCl and 5 meq/l $CaCl_2$. The following table shows the release of turbidity obtained at each pH.

| Magnetite | Washwater | Turbidity (N.T.U.) at each washing pH | | | |
|---|---|---|---|---|---|
| | | pH = 11 | 10.5 | 10.0 | 9.5 |
| 1 | distilled water | 6.5 | 7.0 | 5.6 | 4 |
| 2 | 5 meq/l NaCl | 6.2 | 6.5 | 6.3 | 5 |
| 3 | 5 meq/l $CaCl_2$ | 0.8 | 3.0 | 4.0 | 4 |

This clearly shows that the presence of hardness in wash water inhibits the release of turbidity especially at the higher pH values (pH > 10.5).

EXAMPLE 3

Effect of an Acid Desorption Stage in Regeneration

A series of jar tests were undertaken to test the efficiency of the process in treating water samples chosen to simulate the anticipated characteristics of a hard feedwater. These samples had the following average composition:

| | |
|---|---|
| pH | 7.9 |
| Turbidity | 4 N.T.U. |
| Colour | 20 Pt-Co units |
| $Ca^{2+}$ | 12.9 mg/l |
| $Mg^{2+}$ | 13.4 mg/l |

Clarification was possible at the natural pH, using 1% magnetite with low levels of a number of different polyelectrolytes to reduce turbidity to 0.4 N.T.U. and colour to 3 Pt-Co units. However, regeneration by alkali treatment at pH 10.5 failed to release any turbidity or colour. This shows that hardness helps clarification but hinders regeneration. In this case the hardness was present on the magnetite due to adsorption of $Ca^{2+}$ and $Mg^{2+}$ ions at pH 7.9 in the clarification stage.

The use of an acid treatment prior to regeneration to desorb $Ca^{2+}$ and $Mg^{2+}$ ions from magnetite was demonstrated by treating the loaded magnetite with acidic solutions at different pH's. The following table shows the concentration of $Ca^{2+}$ and $Mg^{2+}$ ions in the acidic solution after a 1 minute contact. The initial acidic solutions were essentially free of $Ca^{2+}$ or $Mg^{2+}$ ions.

Acid desorption of $Ca^{2+}$ and $Mg^{2+}$ ions from magnetite samples

| pH | 6.0 | 4.6 | 3.1 |
|---|---|---|---|
| $(Ca^{2+})$ (mg/l) | 2.30 | 4.70 | 5.40 |
| $(Mg^{2+})$ (mg/l) | 2.00 | 3.50 | 4.40 |

After acid desorption of $Ca^{2+}$ and $Mg^{2+}$ ions, the magnetite samples were regenerated by alkali treatment at pH 10.5 (i.e., the conditions that previously had failed to achieve turbidity or colour release) and the results are shown in the following table for four magnetite samples which had been used in conjunction with different polyelectrolytes.

| | Magnetite sample | | | | | | | |
|---|---|---|---|---|---|---|---|---|
| | 2 | | 3 | | 5 | | 8 | |
| Magnetite sample | T | C | T | C | T | C | T | C |
| Regenerant supernatant | 4 | 73 | 6.5 | 100 | 3.5 | 70 | 11 | 93 |
| 1st washings | 32 | * | 42 | * | 74 | * | 100 | * |
| 2nd washings | 20 | * | 16 | * | 8 | * | 10 | * |

*high turbidity masks colour measurement. T = Turbidity (N.T.U.)
C = Colour (Pt—Co).

Similar results were found in experiments using Yarra River water, although the trends were not as pronounced. The desorption of $Ca^{2+}$ and $Mg^{2+}$ ions prior to regeneration enabled the release of the adsorbed turbidity and colour, presumably because the magnetite was now able to assume a negative surface charge at the regeneration pH, thus facilitating release of the similarly charged colloids.

EXAMPLE 4

Use of Softened Rinse Water

The results of a series of jar tests carried out using raw water from a bore at Mirrabooka, W.A., are shown in the following Table. The tests were continued through a number of clarification-regeneration cycles and the data shown relates to samples taken during the 3rd cycle. The softened water used was produced by ion-exchange and contained less than 0.5 ppm each of $Ca^{2+}$ and $Mg^{2+}$.

| | Raw Water (Turbidity 5.0/Colour 5.4) | | | | | |
|---|---|---|---|---|---|---|
| | Softened Rinse Water | | | Rinse Water | | |
| | i.e.p.* | Turbidity | Colour | i.e.p. | Turbidity | Colour |
| After clarification stage | 3.90 | 0.2 | 16 | 3.35 | 1.7 | 26 |

| | -continued | | | | | |
|---|---|---|---|---|---|---|
| | Raw Water (Turbidity 5.0/Colour 5.4) | | | | | |
| | Softened Rinse Water | | | Rinse Water | | |
| | i.e.p.* | Turbidity | Colour | i.e.p. | Turbidity | Colour |
| Regn.Stage 1 | 4.25 | 0.8 | 53 | 4.10 | 2.0 | 27 |
| Regn.Stage 2 | 4.05 | 0.6 | 31 | 3.52 | 0.2 | 11 |
| Regn.Stage 3 | 5.05 | 0.5 | 11 | 4.20 | 1.2 | 8 |

These data indicate that the use of softened rinse water is beneficial, improving the efficiency of clarification, as is confirmed by the electrokinetic data. *The iso-electric point (i.e.p.) of each magnetite sample was taken after each stage (clarification, regeneration at 10.5, at 11.5 and 10.5 respectively) and was found to be significantly lower for the system using hard rinse water. The i.e.p. of magnetite subjected to an acid desorption step, prior to regeneration in a softened environment was found to be higher, confirming the value of the acid prewash.

We claim:

1. A method for removing suspended impurities and coloured substances from water which has a pH in excess of 5 and contains significant concentrations of calcium and/or magnesium ions which comprises the steps of:
   contacting the water at its natural pH with a coagulant/adsorbent which comprises a finely divided particulate mineral material, the individual particles of which have a thin hydroxylated surface layer having a positive zeta potential at the adsorption pH;
   separating the thus-treated water from the coagulant/adsorbent;
   treating the coagulant/adsorbent with an acidic solution having a pH of not more than 6 to desorb the calcium and/or magnesium ions, washing the thus-treated coagulant/adsorbent with softened water;
   treating the coagulant/adsorbent with a softened alkaline solution to raise the pH to at least 10.5, separating the coagulant/adsorbent from the alkaline solution; and
   washing the coagulant/adsorbent with softened water;
   the softened water used in the washing steps and in the alkaline solution treatment containing not more than 20 ppm of total Ca/Mg.

2. A method as in claim 1 wherein the coagulant/adsorbent is magnetite having a particle size of 10 microns or less.

3. A method as in claim 2 wherein the particle size is from 1 to 5 microns.

4. A method as in claim 1 wherein a polyelectrolyte is added to the water.

5. A method as in claim 1 wherein a polyelectrolyte is added to the water in or before the contacting step.

6. A method for the clarification of water which has a pH in excess of 5 and is hard water containing significant concentrations of calcium and/or magnesium ions, said method comprising the steps of contacting the water at its natural pH with a coagulant/adsorbent which comprises a finely divided particulate mineral material, the individual particles of which have a thin hydroxylated surface layer which has a positive zeta potential at the adsorption pH; separating the water from the coagulant/adsorbent to obtain the clarified water; treating the coagulant/adsorbent with a softened alkali solution to raise the pH to at least 10.5; separating the coagulant/adsorbent from the alkali solution; washing the coagulant/adsorbent with softened water; and recycling the regenerated and washed coagulant/adsorbent to said contacting step.

7. A method for the clarification of hard water, which comprises the steps of:
   (a) contacting the water at its natural pH with a coagulant/adsorbent which comprises a finely divided particulate mineral material, the individual particles of which have a thin hydroxylated surface layer which has a positive zeta potential at the adsorption pH;
   (b) separating the water from the coagulant/adsorbent to obtain the clarified water;
   (c) treating the coagulant/adsorbent with an acidic solution having a pH of not more than 6 to desorb calcium and magnesium ions and washing the thus-treated coagulant/adsorbent with softened water;
   (d) treating the coagulant/adsorbent with a softened alkali solution to raise the pH to at least 10.5;
   (e) separating the coagulant/adsorbent from the alkali solution;
   (f) washing the coagulant/adsorbent with softened water; and
   (g) recycling the regenerated and washed coagulant/adsorbent to step (a).

8. A method for the clarification of water which has a pH in excess of 5 and is hard water containing significant concentrations of calcium and/or magnesium ions, said method comprising the steps of:
   contacting the water at its natural pH with a coagulant/adsorbent which comprises a finely divided particulate mineral material, the individual particles of which have a thin hydroxylated surface layer which has a positive zeta potential at the adsorption pH;
   separating the water from the coagulant/adsorbent to obtain the clarified water;
   treating the coagulant/adsorbent with an acidic solution having a pH of not more than 6 to desorb calcium and magnesium ions and washing the thus treated coagulant/adsorbent with softened water;
   treating the coagulant/adsorbent with a softened alkali solution to raise the pH to at least 10.5;
   separating the coagulant/adsorbent from the alkali solution; washing the coagulant/adsorbent with softened water; and
   recycling the regenerated and washed coagulant/adsorbent to said contacting step.

9. A method for removing suspended impurities and colored substances from hard water, comprising:
   contacting hard water at its natural pH with a coagulant/absorbent which comprises a finely divided particulate mineral material, the individual particles of which have a thin hydroxylated surface layer having a positive zeta potential at the absorption pH;
   separating the thus-treated water from the coagulant/absorbent; and
   regenerating the coagulant/absorbent, by:
   treating the coagulant/absorbent with an acidic solution having a pH of not more than 6 to desorb calcium and magnesium ions therefrom;
   washing the thus-treated coagulant/absorbent with softened water;
   treating the thus-washed coagulant/absorbent with a softened alkaline solution to raise the pH to at least 10.5;
   separating the coagulant/absorbent from the softened alkaline solution; and
   washing the thus-separated coagulant/absorbent with softened water.

* * * * *

UNITED STATES PATENT AND TRADEMARK OFFICE
CERTIFICATE OF CORRECTION

PATENT NO.   : 4,882,064

DATED        : November 21, 1989

INVENTOR(S)  : David R. Dixon; Nevil J. Anderson

It is certified that error appears in the above-identified patent and that said Letters Patent is hereby corrected as shown below: Please change to the following:

On the title page,

[73] Assignee: Commonwealth Scientific and <u>Industrial</u> Research Organization, Campbell, Australia Signed and Sealed this Fourteenth Day of May, 1991

Attest:

HARRY F. MANBECK, JR.

Attesting Officer      Commissioner of Patents and Trademarks